(12) United States Patent
Miki et al.

(10) Patent No.: US 10,005,514 B2
(45) Date of Patent: Jun. 26, 2018

(54) OPERATING DEVICE FOR A BICYCLE

(71) Applicant: Shimano Inc., Sakai, Osaka (JP)

(72) Inventors: Yoshimitsu Miki, Osaka (JP); Yasuhisa Watanabe, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 30 days.

(21) Appl. No.: 15/166,120

(22) Filed: May 26, 2016

(65) Prior Publication Data

US 2016/0272270 A1    Sep. 22, 2016

Related U.S. Application Data

(63) Continuation of application No. 14/075,289, filed on Nov. 8, 2013, now Pat. No. 9,381,971.

(51) Int. Cl.
*B62M 25/04* (2006.01)
*B62K 23/06* (2006.01)
*B62M 25/00* (2006.01)

(52) U.S. Cl.
CPC ............. *B62K 23/06* (2013.01); *B62M 25/00* (2013.01); *B62M 25/04* (2013.01); *Y10T 74/2028* (2015.01)

(58) Field of Classification Search
CPC ...... B62K 23/02; B62K 21/12; B62K 21/125; B62K 21/16; B62M 25/00; B62M 25/04; G05G 1/04; G05G 1/06; F16B 5/0225; F16B 7/0433
USPC ...... 74/488, 473.14, 494; 403/191, 234–236, 403/290, 335–338, 398, 399; 248/651, 248/657, 220.31, 220.41
See application file for complete search history.

(56) References Cited

U.S. PATENT DOCUMENTS

| | | | | |
|---|---|---|---|---|
| 3,722,930 A | * | 3/1973 | Humlong ............... | B62K 21/12 403/395 |
| 5,355,746 A | * | 10/1994 | Lin .......................... | B62J 11/00 224/420 |
| 5,833,534 A | * | 11/1998 | Lai .......................... | F21L 15/14 362/191 |
| 6,446,922 B2 | * | 9/2002 | Irie ......................... | B62J 99/00 248/214 |
| 7,661,858 B2 | * | 2/2010 | Chuang ..................... | B62J 6/02 362/191 |
| 7,849,764 B2 | | 12/2010 | Kua | |

(Continued)

FOREIGN PATENT DOCUMENTS

| | | |
|---|---|---|
| CN | 101746466 | 6/2010 |
| CN | 102107714 A | 6/2011 |

(Continued)

*Primary Examiner* — William Kelleher
*Assistant Examiner* — Bobby Rushing, Jr.
(74) *Attorney, Agent, or Firm* — Jeffer Mangels; Butler & Mitchell LLP; Brennan C. Swain, Esq.

(57) ABSTRACT

An operating device for a bicycle that includes a fixing member that is adapted to be fixed to a bicycle handlebar and includes an adjustment portion, and a housing that includes first, second and third members. The first member and the second member define an adjustment space therebetween and the third member fixes the first member and the second member to each other without passing through the adjustment portion. The adjustment portion of the fixing member is at least partially received in the adjustment space such that the adjustment portion is adjustable relative to the housing in at least a first adjustment direction.

17 Claims, 6 Drawing Sheets

(56) References Cited

U.S. PATENT DOCUMENTS

| | | | |
|---|---|---|---|
| 8,028,601 B2 * | 10/2011 | Miki | B62K 23/06 |
| | | | 74/489 |
| 8,201,476 B2 * | 6/2012 | Tsumiyama | B60T 7/102 |
| | | | 74/502.2 |
| 8,375,823 B2 | 2/2013 | Funai | |
| 8,459,144 B2 | 6/2013 | Kosaka et al. | |
| 8,556,143 B2 * | 10/2013 | Gold | B62J 11/00 |
| | | | 224/413 |
| 8,695,454 B2 | 4/2014 | Tsumiyama | |
| 8,720,300 B2 | 5/2014 | Watarai et al. | |
| 8,958,962 B2 | 2/2015 | Miki | |
| 9,145,183 B2 * | 9/2015 | Kosaka | B62M 25/08 |
| 9,327,793 B2 | 5/2016 | Fukao et al. | |
| 2008/0022803 A1 | 1/2008 | Funai | |
| 2008/0098848 A1 | 5/2008 | Dal Pra et al. | |
| 2008/0202277 A1 | 8/2008 | Miki | |
| 2009/0173181 A1 | 7/2009 | Watarai et al. | |
| 2010/0139442 A1 | 6/2010 | Tsumiyama | |
| 2013/0025988 A1 | 1/2013 | Moore | |
| 2013/0081505 A1 | 4/2013 | Kosaka et al. | |
| 2013/0081507 A1 | 4/2013 | Fukao et al. | |
| 2014/0137696 A1 | 5/2014 | Kosaka et al. | |
| 2014/0252746 A1 * | 9/2014 | Talavasek | B62K 21/12 |
| | | | 280/288.4 |
| 2014/0303859 A1 | 10/2014 | Miki et al. | |
| 2015/0043965 A1 * | 2/2015 | Mao-Cheia | E06B 3/5481 |
| | | | 403/338 |

FOREIGN PATENT DOCUMENTS

| | | |
|---|---|---|
| CN | 201971110 | 9/2011 |
| CN | 103029805 A | 4/2013 |
| EP | 1820725 A2 | 8/2007 |
| JP | 2011136639 | 7/2011 |

\* cited by examiner

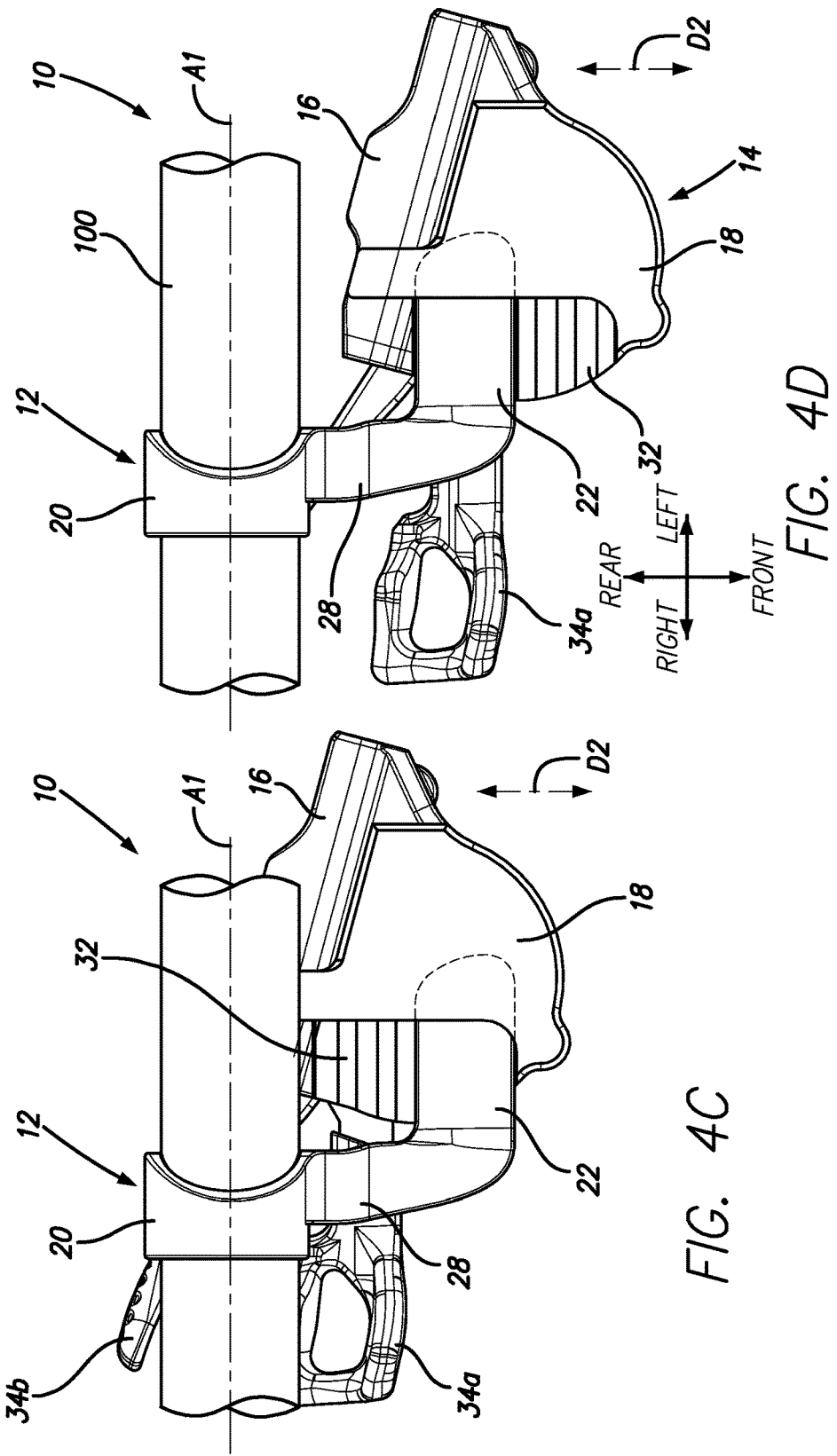

OPERATING DEVICE FOR A BICYCLE

CROSS-REFERENCE TO RELATED APPLICATIONS

This application is a continuation of U.S. patent application Ser. No. 14/075,289, filed on Nov. 8, 2013, which is incorporated herein by reference in its entirety.

FIELD OF THE INVENTION

The present invention relates to an operating device for a bicycle, and more particularly to an operating device that includes an adjustable housing.

BACKGROUND OF THE INVENTION

There are known bicycle operating devices for operating various aspects of the bicycle, such as shifting or braking. For example, some shifting devices are electric powered and configured such that they can be controlled electrically so as to change among a plurality of gear positions. Other shifting devices are mechanical in operation and configured to operate a Borden type cable, for example. These types of devices can be mounted to a handlebar. Regardless of the type of device, due to the differences in the size of riders' hands, it is desirable to provide adjustability of the positioning of the operating members or levers.

In view of the above, there exists a need for an improved bicycle operating device. This invention addresses this need in the art as well as other needs, which will become apparent from this disclosure to those skilled in the art.

SUMMARY OF THE PREFERRED EMBODIMENTS

In accordance with a first aspect of the present invention there is provided an operating device for a bicycle that comprises a fixing member that is adapted to be fixed to a bicycle handlebar and includes an adjustment portion, and a housing that includes first, second and third members. The first member and the second member define an adjustment space therebetween. The third member fixes the first member and the second member to each other without passing through the adjustment portion. The adjustment portion of the fixing member is at least partially received in the adjustment space such that the adjustment portion is adjustable relative to the housing in at least a first adjustment direction.

In accordance with a second aspect of the present invention, the operating device according to the first aspect is configured so that the first adjustment direction is parallel to an axis defined by the bicycle handlebar when the operating device is mounted on the bicycle handlebar.

In accordance with a third aspect of the present invention, the operating device according to the second aspect is configured so that the housing is configured to be adjustable relative to the fixing member in a second adjustment direction.

In accordance with a fourth aspect of the present invention, the operating device according to the third aspect is configured so that the second direction is perpendicular to the first adjustment direction.

In accordance with a fifth aspect of the present invention, the operating device according to the first aspect further comprises at least one protrusion provided on one of the adjustment portion and the housing, and at least one recess provided on the other of the adjustment portion and the housing.

In accordance with a sixth aspect of the present invention, the operating device according to the fifth aspect is configured so that the recess extends in the first adjustment direction so as to slidably receive the protrusion in the first adjustment direction.

In accordance with a seventh aspect of the present invention, the operating device according to the sixth aspect is configured so that the adjustment portion or the housing includes a plurality of recesses, and the protrusion can be selectively received in different recesses such that the housing is displaceable relative to the fixing member in a second adjustment direction.

In accordance with an eighth aspect of the present invention, the operating device according to the seventh aspect is configured so that the first adjustment direction is parallel to an axis defined by the bicycle handlebar when the operating device is mounted on the bicycle handlebar.

In accordance with a ninth aspect of the present invention, the operating device according to the eighth aspect is configured so that the second direction is perpendicular to the first adjustment direction.

In accordance with a tenth aspect of the present invention, the operating device according to the fifth aspect is configured so that the adjustment portion or the housing includes a plurality of recesses, and the protrusion can be selectively received in one of the recesses such that the housing is displaceable relative to the fixing member in the first adjustment direction or a second adjustment direction.

In accordance with a eleventh aspect of the present invention, the operating device according to the fifth aspect is configured so that the protrusion is provided on the adjustment portion and the recess is provided on the first member of the housing, and the first member is configured to accommodate an operating unit.

In accordance with a twelfth aspect of the present invention, the operating device according to the first aspect further comprises an operating unit that includes first and second operating members operatively coupled thereto.

In accordance with a thirteenth aspect of the present invention, the operating device according to the twelfth aspect is configured so that the first and second operating members are trigger levers that are movable between a rest position and an operating position, respectively.

In accordance with a fourteenth aspect of the present invention, the operating device according to the first aspect is configured so that the adjustment portion is clamped between the first member and the second member.

In accordance with a fifteenth aspect of the present invention there is provided an operating device for a bicycle that comprises a fixing member adapted to be fixed to a bicycle handlebar and includes an adjustment portion, and a housing including a first member and a second member that define an adjustment space therebetween. The adjustment space receives at least a portion of the adjustment portion of the fixing member such that the adjustment portion is adjustable relative to the housing in at least a first adjustment direction and a second adjustment direction.

In accordance with a sixteenth aspect of the present invention, the operating device according to the fifteenth aspect is configured so that the first adjustment direction is parallel to an axis defined by the bicycle handlebar when the operating device is mounted on the bicycle handlebar, and the second direction is perpendicular to the first adjustment direction.

In accordance with a seventeenth aspect of the present invention, the operating device according to the fifteenth aspect further comprises at least one protrusion provided on one of the adjustment portion and the housing and a plurality of recesses provided on the other of the adjustment portion and the housing. The recesses extend in the first adjustment direction so as to slidably receive the protrusion in the first adjustment direction and the protrusion can be selectively received in different recesses such that the housing is displaceable relative to the fixing member in the second adjustment direction.

The invention, together with additional features and advantages thereof, may be best understood by reference to the following description.

BRIEF DESCRIPTION OF THE DRAWINGS

FIG. 4C is an elevational view of the operating device of FIG. 1;

FIG. 4D is an elevational view of the operating device of FIG. 1 showing the position of the housing adjusted in a second adjustment direction when compared to FIG. 4C;

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As used herein to describe the present invention, the following directional terms "front", "rear", "forward", "rearward", "left", "right", "transverse", "upward" and "downward" as well as any other similar directional terms refer to those directions which are determined on the basis of the rider who sits on a saddle of a bicycle (not shown) with facing a bicycle handlebar 100, for example. Accordingly, these terms, as utilized to describe the present invention should be interpreted relative to the bicycle equipped with the present invention as used in the normal riding position on a level surface.

Figure 2:
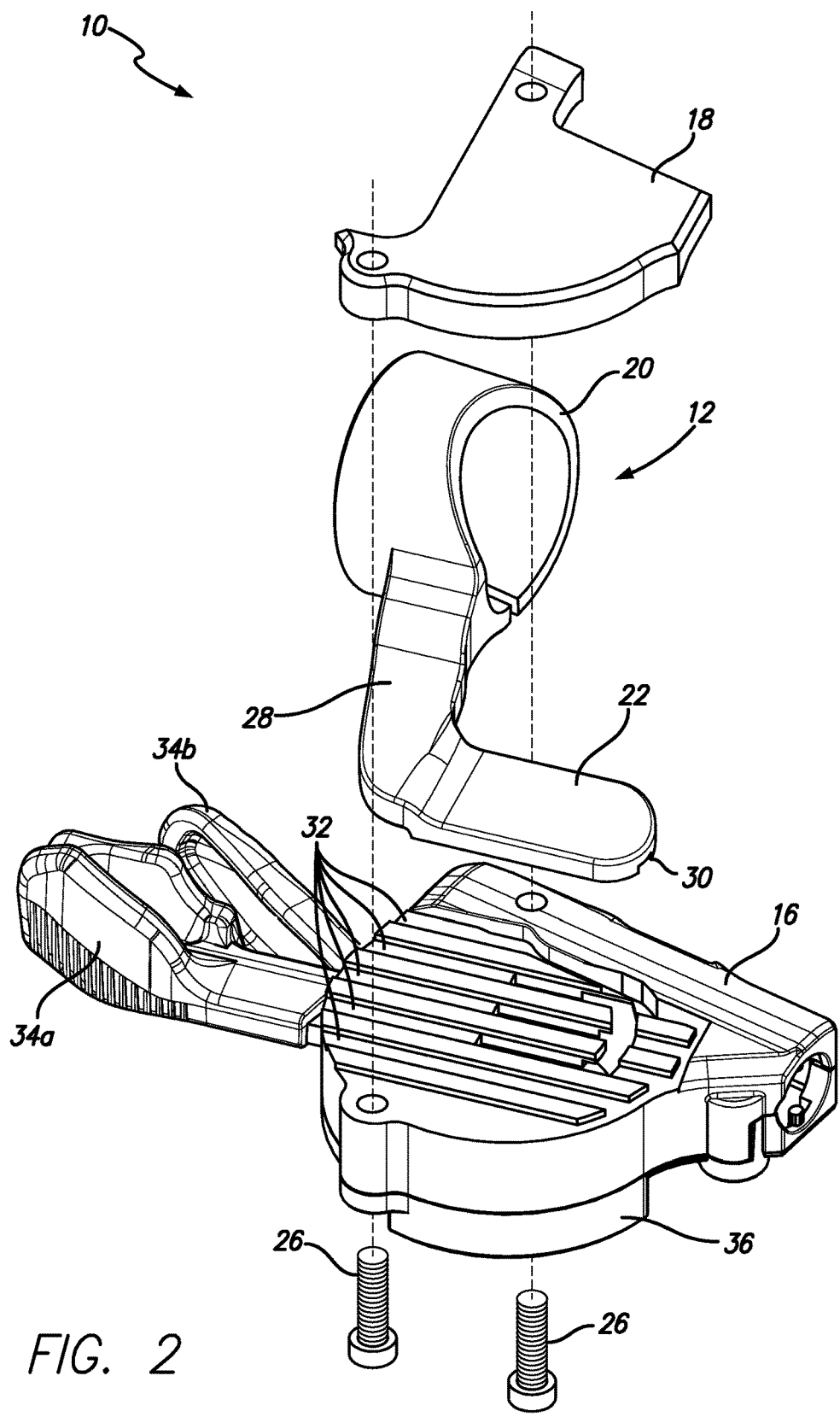
FIG. 2 is an exploded perspective view of the operating device of FIG. 1.

Referring to FIGS. 1-4E, an operating device 10 that is adapted to be mounted on or attached to the bicycle handlebar 100 is illustrated in accordance with an embodiment of the present invention. The operating device 10 generally includes a fixing member 12 and a housing 14 that includes first and second members 16 and 18. In a preferred embodiment, the fixing member 12 includes a fixing portion 20 and an adjustment portion 22 (FIG. 2). The fixing portion 20 is adapted to be attached to the bicycle handlebar 100. In a preferred embodiment, the fixing portion 20 is formed as a C-shape member and is fixed to the bicycle handlebar 100 by using a fastener member, e.g., a bolt (not shown). Such clamp members are well known in the art and, therefore, other types of clamp members or fixing portions can be used. An open clamp type fixing member comprising two hingedly pivotable parts can be used, for example.

Figure 1:
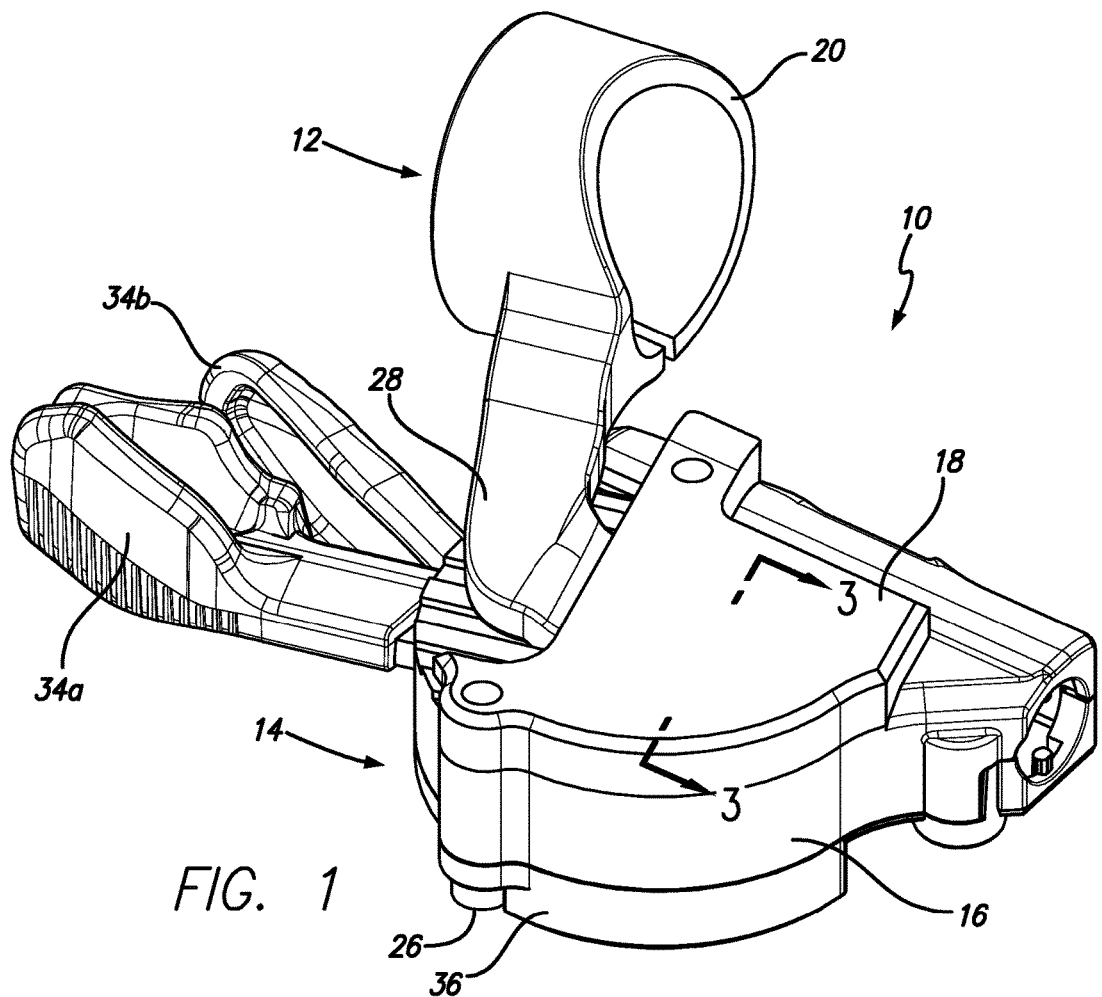
FIG. 1 is a perspective view of an operating device in accordance with a preferred embodiment of the present invention.
Figure 3:
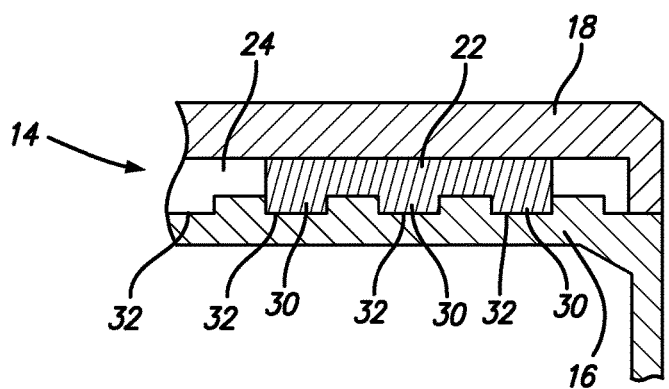
FIG. 3 is a partial cross-sectional view taken along line 3-3 of FIG. 1.

As is shown in FIG. 3, the first and second members 16 and 18 define an adjustment space 24 therebetween that receives at least a portion of the adjustment portion 22. In a preferred embodiment, the adjustment portion 22 is adjustable with respect to the housing 14 (within the adjustment space 24) in at least a first adjustment direction D1 and preferably also in a second adjustment direction D2. The adjustment portion 22 is preferably clamped between the first and second members 16 and 18. To secure the adjustment portion 22 in a desired position, the housing 14 includes at least one third member 26 that secures or fixes the first member 16 and the second member 18 to each other. In a preferred embodiment, the third members 26 are threaded fasteners or bolts that extend from the first member 16 to the second member 18 (or vice versa) and are screwed into the second member 18 so as to clamp the adjustment portion 22 therebetween. In another embodiment, the third member can be a protrusion or protrusions provided one of the first and second members to snap-fit it to the other of the first and second members. Preferably, the third members 26 extend without passing through the adjustment portion 22, which allows the adjustment portion 22 to be adjustable in at least the first adjustment direction D1 without having to remove the third members 26 from the housing 14.

As shown in FIG. 2, in a preferred embodiment, the fixing member 12 includes a neck portion 28 extending between the fixing portion 20 and the adjustment portion 22. In a preferred embodiment, the portion of the neck portion 28 that is immediately adjacent the adjustment portion 22 is thicker than the adjustment space 24. This prevents the neck portion 28 from extending into the adjustment space 24.

As shown in FIGS. 1-4E, in a preferred embodiment, adjustability is provided by complementary protrusions 30 and channels or recesses 32. It will be appreciated by those skilled in the art that the protrusions 30 and recesses 32 can be disposed on the adjustment portion 22 and/or the housing 14. Furthermore, the protrusions 30 and recesses 32 can be formed or positioned on either or both sides of the adjustment portion 32 and on the inside surface of either or both of the first and second members 16 and 18. In the figures, the protrusions 30 are formed on the adjustment portion 22 and the recesses 32 are formed on the first member 16 of the housing 14. However, this is not a limitation on the present invention. Further, in the figures, the number of the protrusions 30 is three and the number of the recesses 32 is five. However, this is not a limitation on the present invention. The recess(es) 32 can be provided in at least the same number as the protrusion(s) 30. However, there are preferably more recesses 32 than protrusions 30 to achieve the adjustability described below. Any number of recesses 32 and protrusions 30 are within the scope of the present invention.

As shown in FIG. 2, the recesses 32 are elongated and extend in a parallel direction with respect to each other such that the recesses 32 allow the protrusion 30 to slide therealong. In its simplest form, a single protrusion 30 can be slidably received in a single recess 32, thereby allowing adjustability in a first adjustment direction D1 parallel to the length of the recess 32.

In a preferred embodiment, the first member 16 includes more recesses 32 than the protrusions 30 of the adjustment portion 22. This allows adjustability in a second adjustment direction D2 that is generally perpendicular to the first adjustment direction D1.

Adjustment of the position of the housing 14 with respect to the fixing member 12 when the fixing portion 20 is fixed to a bicycle handlebar 100 will now be described. FIGS. 4A-4E show the housing 14 (and components thereof) positioned at a plurality of different locations with respect to the fixing member 12.

Figure 4A:
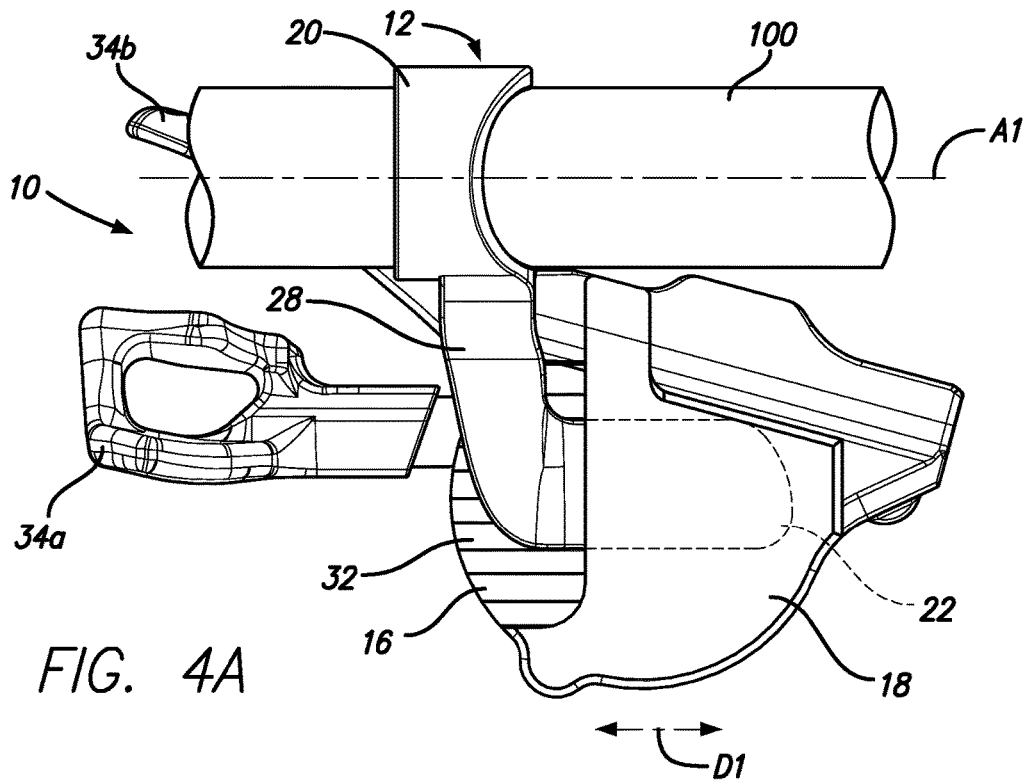
FIG. 4A is an elevational view of the operating device of FIG. 1.
Figure 4B:
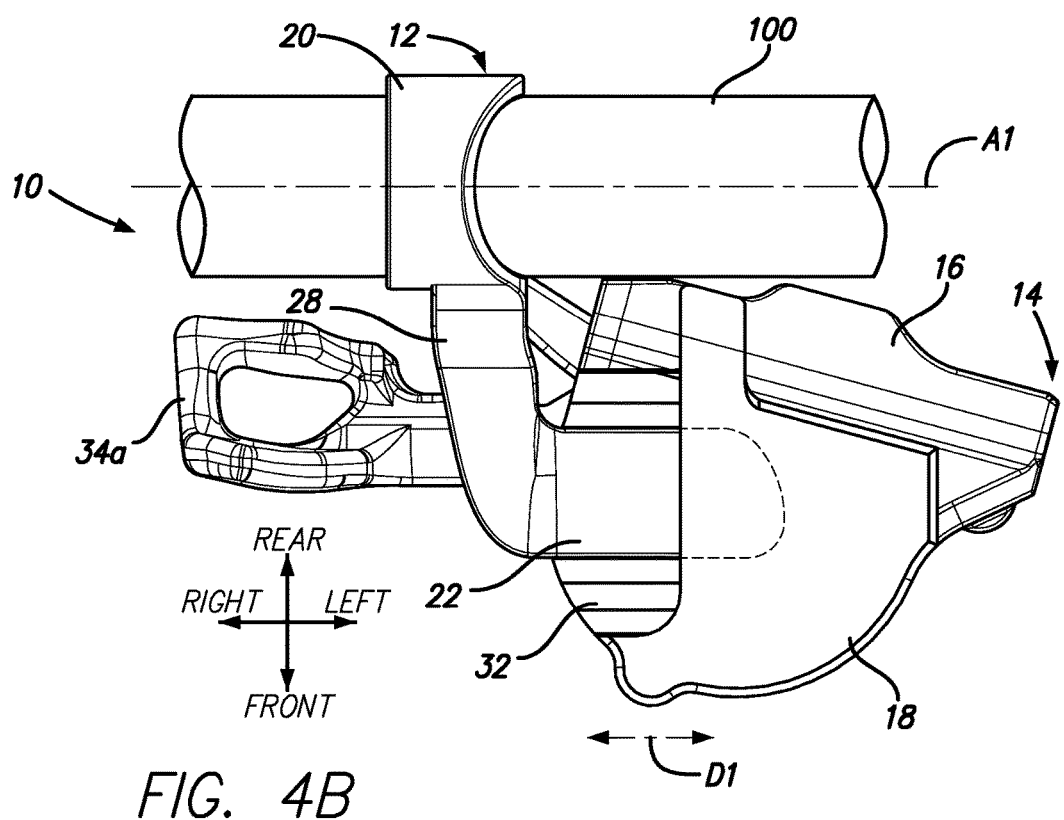
FIG. 4B is an elevational view of the operating device of FIG. 1 showing the position of the housing adjusted in a first adjustment direction when compared to FIG. 4A.

FIGS. 4A-4B demonstrate adjustment in the first adjustment direction D1. In FIG. 4B it can be seen that the entire housing member 14 has moved in the first adjustment direction D1 (specifically, it has moved to a rider's left) compared to FIG. 4A (as the fixing members 12 are lined up vertically in FIGS. 4A and 4B). This is done by loosening the third members 26, and moving the housing 14 to the left, such that the protrusions 30 slide within the recesses 32 to the desired position, and then retightening the third members 26 to clamp the adjustment portion 22 between the first and second members 16 and 18 within the adjustment space 24.

FIGS. 4C-4D demonstrate adjustment in the second adjustment direction D2. In FIG. 4D it can be seen that the entire housing member 14 has moved in the second adjustment direction D2 (specifically, it has moved forward with respect to a rider) compared to FIG. 4C (as the fixing members 12 are lined up horizontally in FIGS. 4C and 4D). This is done by loosening the third members 26, moving the first member 16 and the second member 18 with respect to each other so that the protrusions 30 can be displaceable to different recesses 32, moving the housing 14 forwardly with respect to the fixing member 12 so as to align the protrusions 30 with different recesses 32, placing the first and second members 16 and 18 back together, and then retightening the third members 26 to clamp the adjustment portion 22 between the first and second members 16 and 18 within the adjustment space 24.

Figure 4E:
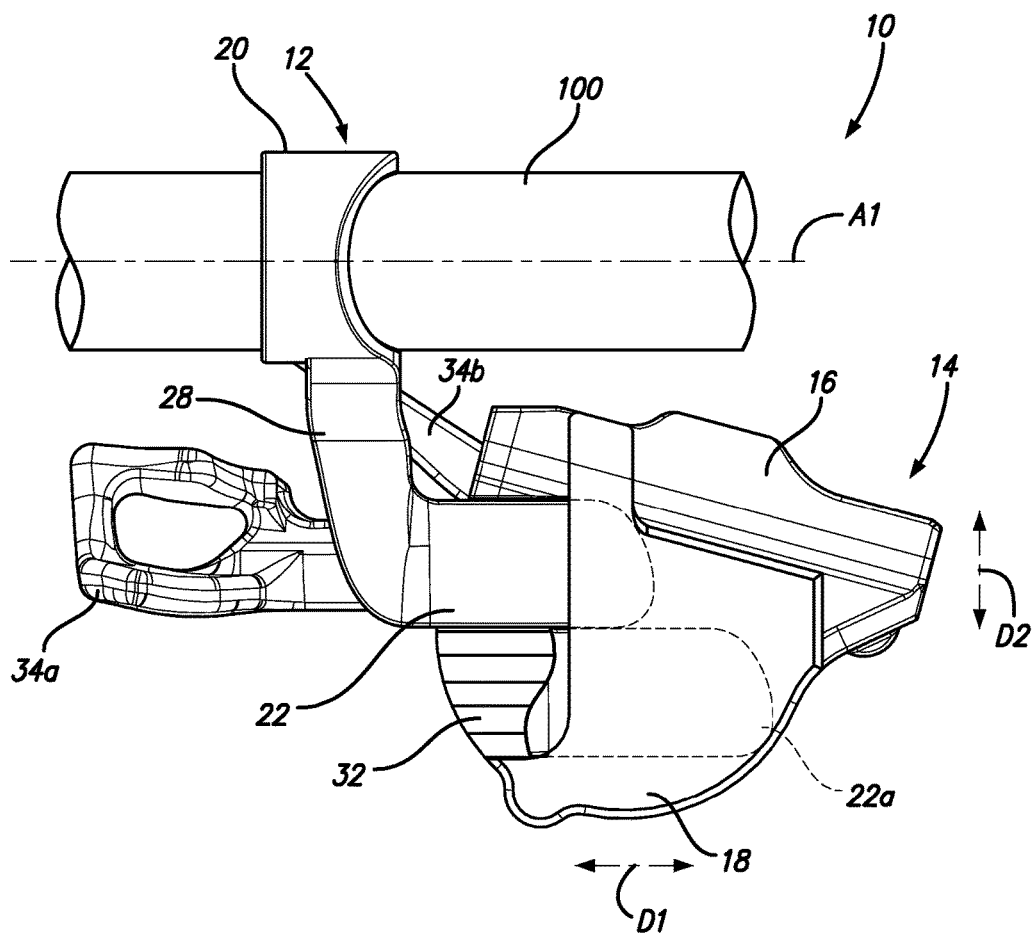
FIG. 4E is an elevational view of the operating device of FIG. 1 showing different possible positions of the adjustment portion.

FIG. 4E shows within a single figure a combination of adjustment in the first adjustment direction D1 and the second adjustment direction D2, which results in diagonal adjustability. Accordingly, it will be appreciated by those of skill in the art that providing adjustability in the two different directions provides a wide range of adjustability from a first position (represented by the adjustment portion 22 that includes the fixing portion 20) to any second position (represented by the adjustment portion labeled 22a).

As is shown in FIGS. 4A-4E, in a preferred embodiment, the first adjustment direction D1 is parallel to an axis A1 defined by the bicycle handlebar 100 when the operating device 10 is mounted on a bicycle handlebar 100 and the second adjustment direction D2 is perpendicular to the first adjustment direction D1. However, this is not a limitation on the present invention.

In a preferred embodiment the operating device 10 includes first and second operating members 34a and 34b that are operatively coupled to the housing 14. Preferably, the first and second operating members 34a and 34b are part of an operating unit 36 that is coupled to the first member 16. The operating members 34a and 34b can be used, for example, for shifting gears on a bicycle. In a preferred embodiment, the first and second operating members 34a and 34b are trigger levers that are movable between a rest position and an operating position.

Figure 5:
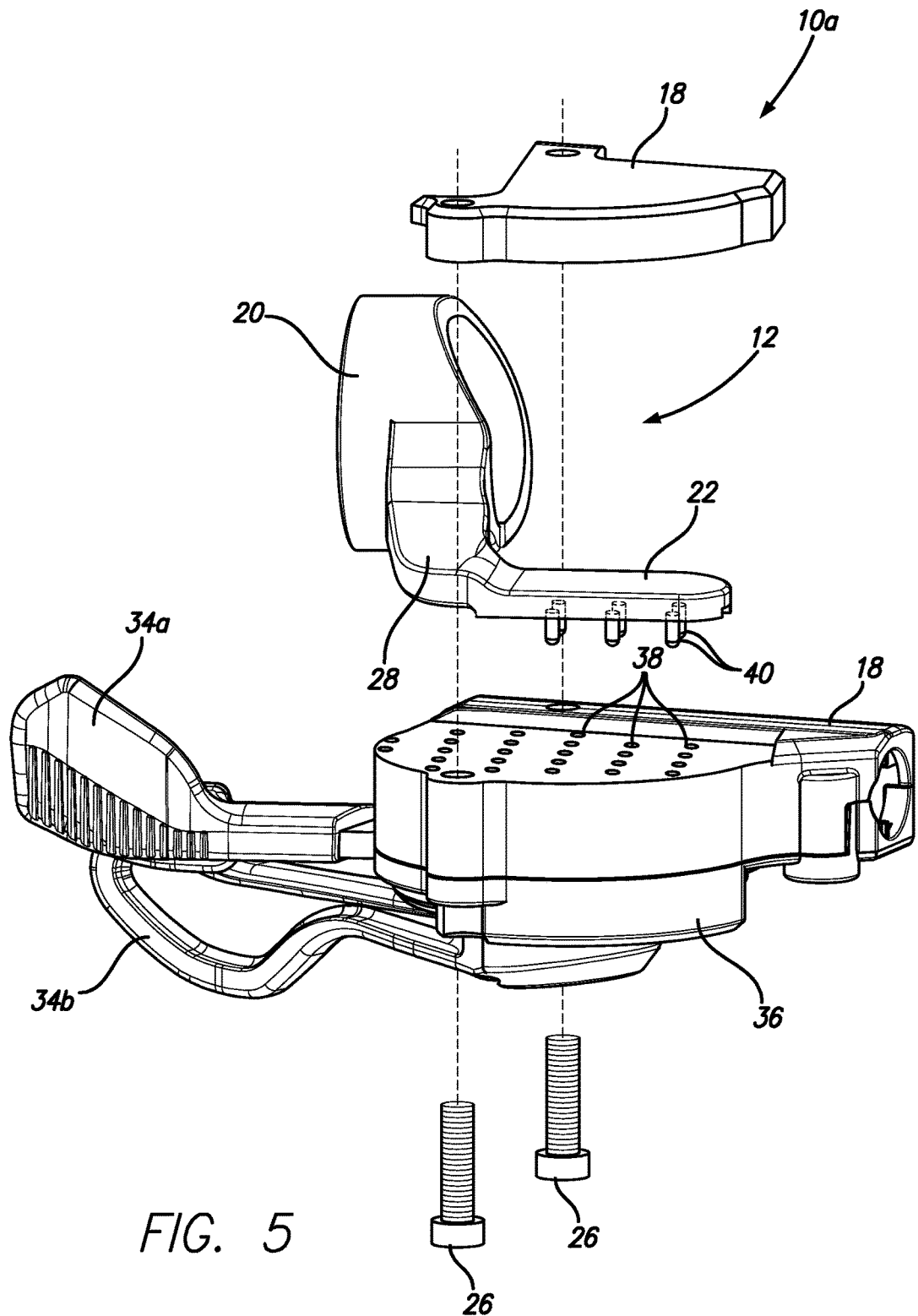
FIG. 5 is an exploded perspective view of an operating device in accordance with another preferred embodiment of the present invention.

FIG. 5 shows an operating device 10a which is another preferred embodiment of the present invention. In this embodiment, the elongated recesses and protrusions are omitted and are replaced by recesses 38 and protrusions 40. It will be understood that recesses 38 and protrusions 40 do not provide sliding adjustability. Instead, adjustment is provided by removing or loosening the second member 18 and moving the protrusions 40 to a different set of recesses 38. In this embodiment, adjustment can be made in both the first adjustment direction D1 and the second adjustment direction D2 by selectively moving the protrusions 40 into different recesses 38. In its simplest form, a single protrusion 40 and a plurality of recesses 38 are provided and the protrusion 40 can be moved from one recess 38 to another recess 38 to provide adjustability. The recesses 38 and protrusions 40 can be any shape provided a male and female relationship exists between the two.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An operating device for a bicycle, the operating device comprising:
    a fixing member adapted to be fixed to a bicycle handlebar, wherein the fixing member includes an adjustment portion, and
    a housing including a first member, a second member and a third member, wherein the first member and the second member define an adjustment space therebetween, wherein the third member fixes the first member and the second member to each other without passing through the adjustment portion, wherein the adjustment portion of the fixing member is at least partially received in the adjustment space such that the housing is adjustable relative to the adjustment portion in at least a first adjustment direction, and
    an operating unit coupled to the housing, wherein the operating unit includes a first lever that is movable between a rest position and an operating position.

2. The operating device of claim 1 wherein the first adjustment direction is parallel to an axis defined by the bicycle handlebar where the fixing member is fixed to the bicycle handlebar when the operating device is mounted on the bicycle handlebar.

3. The operating device of claim 2 wherein the housing is configured to be adjustable relative to the fixing member in a second adjustment direction.

4. The operating device of claim 3 wherein the second direction is perpendicular to the first adjustment direction.

5. The operating device of claim 1 further comprising at least one protrusion provided on one of the adjustment portion and the housing, and at least one recess provided on the other of the adjustment portion and the housing.

6. The operating device of claim 5 wherein the recess extends in the first adjustment direction so as to slidably receive the protrusion in the first adjustment direction.

7. The operating device of claim 6 wherein the adjustment portion or the housing includes a plurality of recesses, and wherein the protrusion can be selectively received in one of the recesses such that the housing is displaceable relative to the fixing member in a second adjustment direction.

8. The operating device of claim 7 wherein the first adjustment direction is parallel to an axis defined by the bicycle handlebar where the fixing member is fixed to the bicycle handlebar when the operating device is mounted on the bicycle handlebar.

9. The operating device of claim 8 wherein the second direction is perpendicular to the first adjustment direction.

10. The operating device of claim 5 wherein the adjustment portion or the housing includes a plurality of recesses, and wherein the protrusion can be selectively received in one of the recesses such that the housing is displaceable relative to the fixing member in the first adjustment direction or a second adjustment direction.

11. The operating device of claim 5 wherein the protrusion is provided on the adjustment portion and the recess is provided on the first member of the housing, and wherein the first member is configured to accommodate an operating unit.

12. The operating device of claim 1 wherein the operating unit includes a second lever that is movable between a rest position and an operating position.

13. The operating device of claim 1 wherein the adjustment portion is clamped between the first member and the second member.

14. An operating device for a bicycle, the operating device comprising:
    a fixing member adapted to be fixed to a bicycle handlebar, wherein the fixing member includes an adjustment portion, and
    a housing including a first member and a second member that define an adjustment space therebetween, wherein the adjustment space receives at least a portion of the adjustment portion of the fixing member such that the housing is adjustable relative to the adjustment portion in a first adjustment direction and a second adjustment direction, and
    an operating unit coupled to the housing, wherein the operating unit includes a first lever that is movable between a rest position and an operating position.

15. The operating device of claim 14 wherein the first adjustment direction is parallel to an axis defined by the bicycle handlebar where the fixing member is fixed to the bicycle handlebar when the operating device is mounted on the bicycle handlebar, and wherein the second direction is perpendicular to the first adjustment direction.

16. The operating device of claim 14 further comprising at least one protrusion provided on one of the adjustment portion and the housing, and a plurality of recesses provided on the other of the adjustment portion and the housing, wherein the recesses extend in the first adjustment direction so as to slidably receive the protrusion in the first adjustment direction, and wherein the protrusion can be selectively received in one of the recesses such that the housing is displaceable relative to the fixing member in the second adjustment direction.

17. The operating device of claim 14 wherein the operating unit includes a second lever that is movable between a rest position and an operating position.

* * * * *